US010083332B2

(12) United States Patent
Pogorelik et al.

(10) Patent No.: US 10,083,332 B2
(45) Date of Patent: Sep. 25, 2018

(54) QR IMAGE BASED DEVICE MANAGEMENT

(71) Applicant: Intel Corporation, Santa Clara, CA (US)

(72) Inventors: Oleg Pogorelik, Lapid (IL); Alex Nayshtut, Gan Yavne, D (IL); Hong Li, El Dorado Hills, CA (US); Justin Lipman, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/325,347

(22) PCT Filed: Aug. 8, 2014

(86) PCT No.: PCT/CN2014/083964
§ 371 (c)(1),
(2) Date: Jan. 10, 2017

(87) PCT Pub. No.: WO2016/019565
PCT Pub. Date: Feb. 11, 2016

(65) Prior Publication Data
US 2017/0185817 A1 Jun. 29, 2017

(51) Int. Cl.
G06K 7/10 (2006.01)
G06K 7/14 (2006.01)
H04L 9/32 (2006.01)

(52) U.S. Cl.
CPC .............. *G06K 7/1417* (2013.01); *H04L 9/32* (2013.01)

(58) Field of Classification Search
USPC ............................... 235/462.01–462.49, 494
See application file for complete search history.

(56) References Cited

U.S. PATENT DOCUMENTS

| 4,825,058 A * | 4/1989 | Poland .................. G06F 3/0227 235/383 |
| 7,273,175 B2 * | 9/2007 | Zhao ........................ G06K 7/14 235/454 |
| 2006/0065733 A1 | 3/2006 | Lee et al. |

FOREIGN PATENT DOCUMENTS

| CN | 102917132 A | 2/2013 |
| CN | 102932148 A | 2/2013 |
| EP | 0265148 A2 | 4/1998 |
| JP | 2012208796 A | 10/2012 |
| KR | 101247387 B1 | 3/2013 |

OTHER PUBLICATIONS

International Search and Written Opinion dated May 19, 2015 from International Application No. PCT/CN2014/083964, 13 pages.
Extended European Search Report dated Jun. 12, 2018 for European Patent Application No. 14899318.1, 7 pages.

* cited by examiner

*Primary Examiner* — Jamara Franklin
(74) *Attorney, Agent, or Firm* — Schwabe, Williamson & Wyatt, P.C.

(57) ABSTRACT

In embodiments, apparatuses, methods, and storage media may be described for identifying a quick response (QR) image. A QR control code (QRCC) may be identified in the QR image based on a QR tag in the image. Based on the QRCC, a control command of an apparatus may be identified. Other embodiments may be described and/or claimed.

18 Claims, 6 Drawing Sheets

QR IMAGE BASED DEVICE MANAGEMENT

CROSS REFERENCE TO RELATED APPLICATIONS

The present application is a national phase entry under 35 U.S.C. § 371 of International Application No. PCT/CN2014/083964, filed Aug. 8, 2014, entitled "QR IMAGE BASED DEVICE MANAGEMENT", which designated, among the various States, the United States of America and is hereby incorporated by reference.

FIELD

Embodiments of the present invention relate generally to the technical field of image processing and data communication and, in particular, to provisioning and control video capable devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Sales and usage of smart devices such as smartphones, laptops, tablets, or computing devices with advanced processing capabilities such as cameras, music players, or other devices are currently increasing. Based on this sales and usage, an Internet of things (IOT) market is expected to significantly increase in the near future. Specifically, IOT may refer to uniquely identifiable objects and their virtual representation in an Internet-like structure. An IOT device may be, for example, one of the smart devices described above.

Currently, IOT principles may require IOT devices to be manageable over existing wireless or wired connections. However, these connections may open the IOT device to network attacks, and establish requirements for difficult or costly IOT device protection systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
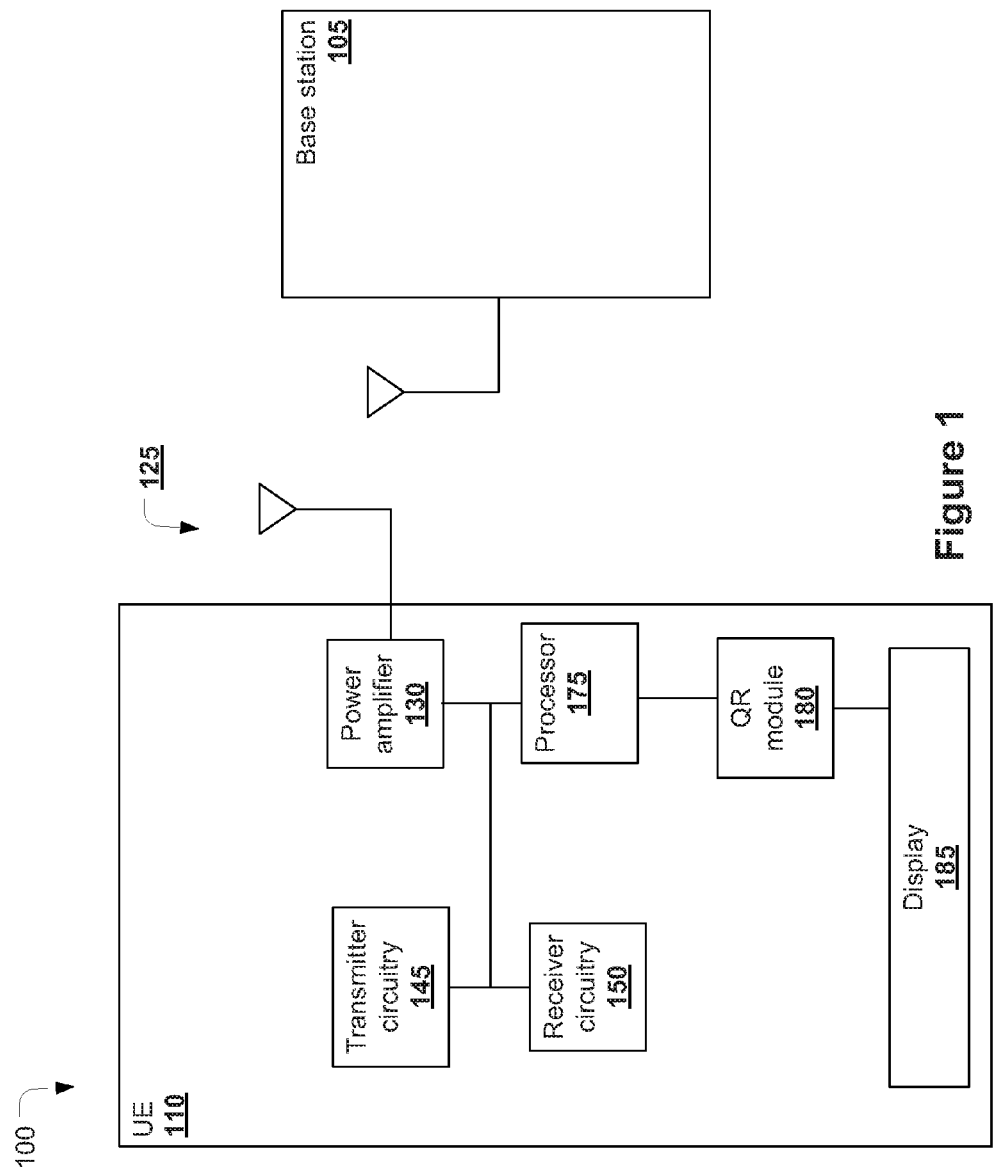
FIG. 1 schematically illustrates a high-level example of a radio network comprising a user equipment (UE) incorporated with a quick response (QR) module, and a base station, in accordance with various embodiments.

In embodiments, apparatuses, methods, and storage media may be described for controlling a VCD using QRCCs in a QR image. Specifically, an image including a QRCC may be provided to the VCD. For example, a video camera of the VCD may receive the image from a printed sheet of paper, a smartphone display screen, or some other source. The image may include a QRCC that may provide a specific command for the VCD. The QRCC may be compared to an internal dictionary of the VCD, and a command may be identified and carried out by the VCD.

Using a QRCC to provision a VCD may have several benefits. For example, a QR reader of the VCD may transfer the command contained in the QRCC to the VCD's management agent via an internal trusted interface, which may minimize potential security issues and increase security of information flow. Additionally, a manager such as a system administrator or a network manager may be able to control the VCD securely by showing a QR image containing a QRCC to the camera of the VCD. In this manner, a user may be able to manipulate the VCD or perform "sensitive" operations such as device first-time provisioning, pairing with a management server, a credentials update, or other operations.

The use of a QRCC to provision a VCD may have additional benefits. For example, the QRCC may enable manageability of a VCD that is not directly connected to a network, or whose network connection is temporarily disabled. Additionally, the QRCC may provide a secure way of communication with the VCD that may be faster, more reliable, or otherwise more desirable than a network-based means of communication. Additionally, the QRCC may save money and materials by eliminating the need to implement a network interface in the VCD. Additionally, user involvement of presence may serve as an additional trust or verification factor in certain operations or actions of the VCD. Additionally, certain QRCCs may serve as a master key for forcing a reset of a VCD when the device is disabled or affected by malicious software, malware, or an administrator. Further, certain QRCCs may be used to configure or provision a new VCD at the point-of-sale, or during initialization or setup of the VCD.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 schematically illustrates an example wireless network 100 (hereinafter "network 100") in accordance with various embodiments. The network 100 may include a UE 110 communicatively coupled with a base station (BS) 105. In some embodiments, the UE 110 may be an IOT device.

Specifically, in some embodiments, the network 100 may be an access network of a third generation partnership project (3GPP) LTE network. In these embodiments the BS 105 may be a 3GPP-defined eNodeB (eNB, also referred to as an evolved NodeB) configured to wirelessly communicate with the UE 110 using a wireless protocol such as the 3GPP LTE wireless protocol. In other embodiments, the base station 105 may be an access point (AP) of a Wi-Fi network as defined by the Institute of Electrical and Electronics Engineers (IEEE) 802.11 standards. In other embodiments, the BS 105 may be a station of a network according to a different wireless standard. In other embodiments (not shown), the BS may be communicatively coupled with the UE 110 via a wired connection or wired network.

As shown in FIG. 1, the UE 110 may be coupled with one or more of a plurality of antennas 125 of the UE 110 for communicating wirelessly with other components of the network 100, e.g., BS 105 or another UE. The antennas 125 may be powered by a power amplifier 130. In some embodiments the UE 110 may include transmitter circuitry 145 configured to transmit or cause the UE 110 and/or antennas 125 to transmit signals over network 100, and receiver circuitry 150 configured to receive or cause the UE 110 and/or antennas 125 to receive signals over network 100. In some embodiments, the signals may be wireless and the transmitter and/or receiver circuitry 145 and 150

In some embodiments the transmitter circuitry 145 or receiver circuitry 150 may be coupled with a processor 175 configured to send or receive data to the transmitter circuitry 145 and/or receiver circuitry 150. Additionally, the processor 175 may be coupled with a QR module 180 configured to identify or generate one or more QR images and/or QRCCs as described in further detail below. Specifically, the QR module 180 may be configured to generate a QR image that includes a QRCC that is displayed on display 185, for example, using a QR encryption algorithm.

Figure 2:
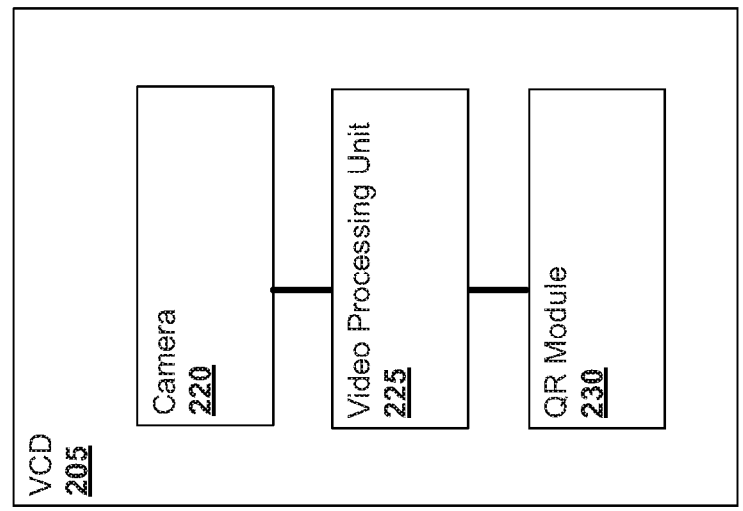
FIG. 2 illustrates a high-level example of a UE and a video capable device (VCD), in accordance with various embodiments.
Figure 2:
Figure 2:
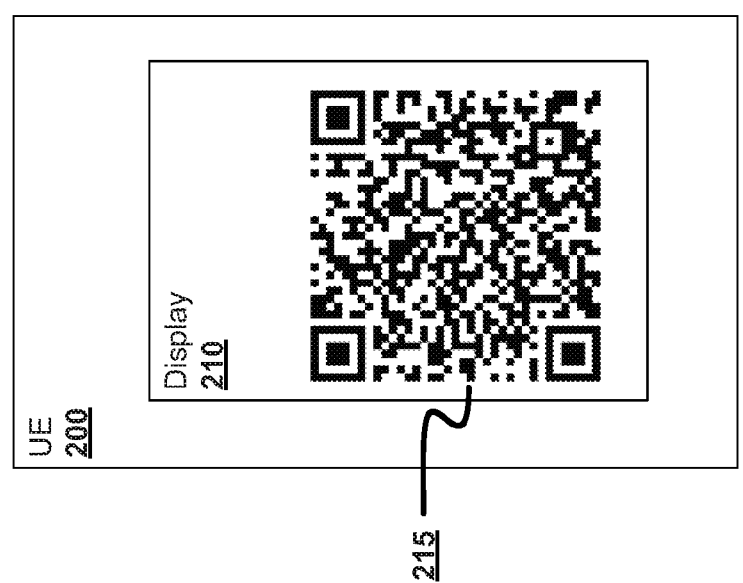

FIG. 2 depicts an example of a UE 200 and a VCD 205. UE 200 may be similar to UE 110, and include a display 210 which may be similar to display 185. Display 210 may be a liquid crystal display (LCD), a light-emitting diode (LED) display, or some other type of display that is able to display one or more moving or still images such as QR image 215.

The UE 200, and specifically the QR image 215, may be in the vicinity of or otherwise viewable by a VCD 205 that may include a camera 220 and a video processing unit 225. Specifically, the camera 220 of the VCD 205 may be configured to capture one or more images or frames of an image, and then convey some or all of the frames or images to the video processing unit 225. In some embodiments, the captured image may be a QR image such as QR image 215, and the VCD 205 may include a QR module 230 coupled with the video processing unit 225 and configured to perform one or more actions or functions related to the QR image 215.

Figure 3:
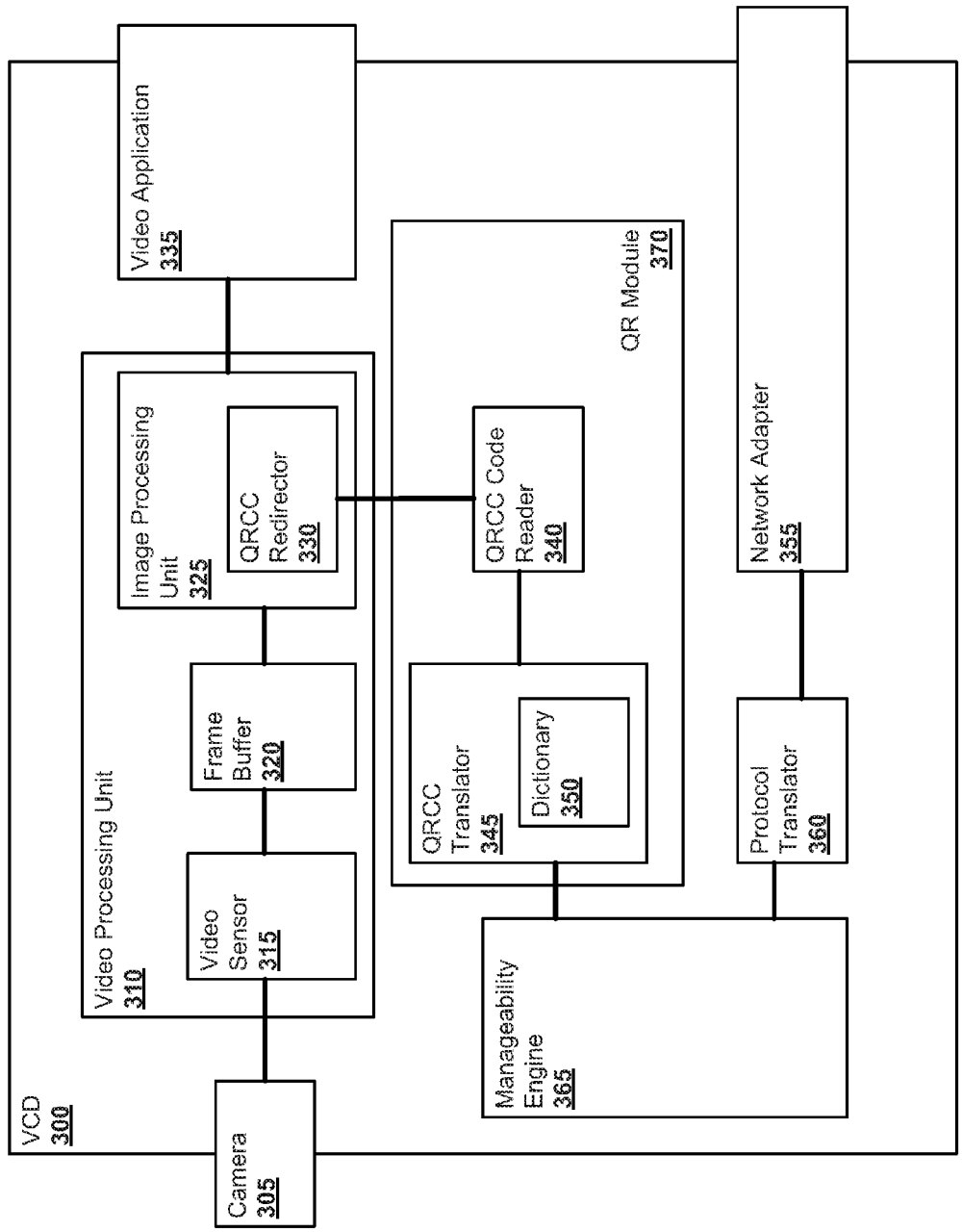
FIG. 3 illustrates an example of a VCD, in accordance with various embodiments.

FIG. 3 depicts a more detailed example of a VCD 300, which may be similar to VCD 205. VCD 300 may include a camera 305, a video processing unit 310, and a QR module 370 which may be similar to camera 220, video processing unit 225, and QR module 230, respectively. As noted above, camera 305 may be configured to receive one or more moving or still images at the VCD 300. For example, the images may come from a display of a UE 200 such as display 210. In other embodiments, the images may be received from a printed material such as a printed tag or piece of paper, a display of a computer or other computing device, or some other visual item.

The camera 305 may be coupled with a video processing unit 310 that is configured to process the received image or images. The video processing unit 310 may include a video sensor 315 that is configured to identify that an image was received by camera 305. The video sensor 315 may pass the image to a frame buffer 320 that is configured to convert the image to some form of computer-readable format such as a binary string, a hexadecimal string, machine language, or some other computer-readable format.

The frame buffer 320 may then be coupled with an image processing unit 325. The image processing unit may be configured to process the computer-readable formatted image to identify what is contained within the image. For example, the image processing unit may be configured to identify whether the image is a QR image. Specifically, the image processing unit 325 may include a QRCC redirector 330. The QRCC redirector 330 may be configured to identify whether the image is or includes a QR image, and then process the image accordingly, for example, by passing the image to QR module 370. If the image processing unit 325 identifies that the received image is not a QR image, or does not include a QR image, then the image processing unit 325 may pass the image to a video application 335. In some embodiments, the video application 335 may display the image, or perform one or more processes related to the image or an application of the VCD 300.

However, if the QRCC redirector 330 identifies that the image is or includes a QR image, the QRCC redirector 330 may pass the image to a QR module 370. For example, it may be assumed that most images received by the VCD 300 will not be QR images. Therefore, the QRCC redirector 330 may run a check related to every video frame or image received by the VCD 300 to identify possible appearances of a QR image. For example, a QR image may be recognized or identified based on three black rectangles in the corners of the QR image.

If the image is identified as being or including a QR image, then the QRCC redirector may forward the QR image to the QR module 370. In some embodiments, the QRCC redirector 330 may also be configured to identify whether the content of the QR image includes a QRCC tag. Specifically, the QRCC tag may be used to identify the content of the QR image as a QRCC, rather than a uniform resource locator (URL) of the web site, text, or some other type of data or information.

The QR module 370 may include a QRCC code reader 340, and a QRCC translator 345. The QRCC code reader 340 may be configured to accept the QR image, and identify the QRCC contained within the QR image. The QRCC code reader 340 may then convey the QRCC to the QRCC translator 345. The QRCC translator may be configured to identify the specific control command indicated by the QRCC. In embodiments, the control command may relate to management of the VCD 300, and in some embodiments may be referred to as a "management command" or a "device management command."

In embodiments, the QRCC translator 345 may include, or otherwise be coupled with, a dictionary 350. The dictionary 350 may include one or more indications of specific control commands of the VCD 300 that are indicated by the received QRCC. In some embodiments, the QRCC translator 345 may be further configured to confirm that the control command and the QRCC format is valid, and the control command represented by the QRCC is registered in the list of control commands accepted by or related to the VCD 300. For example, as mentioned above the QR image may include a URL, text, or some other type of data or information that may not correspond to a command of the VCD 300.

In some embodiments, the control command may be a control command to reboot the VCD 300. In some embodiments, the control command may be a control command related to security of the VCD 300. In some embodiments, the control command may be a control command related to configuration of the VCD 300. In some embodiments, the control command may be a control command to reset the VCD 300. In some embodiments, the control command may be a control command to perform recovery of the VCD 300.

Upon identifying the control command, the QR module 370 may transmit the control command to the manageability engine 365 of the VCD 300. The manageability engine 365 may be configured to further authenticate and execute the control command identified by the QR module 370. In some embodiments, the VCD 300 may further include a network adapter 355 configured to receive one or more control commands from a separate wired or wireless network, and a protocol translator 360 coupled with the network adapter 355 and configured to translate the received control command into the format appropriate for authentication or execution by the manageability engine 365.

In some embodiments, the QR image may include additional data or information that may be used to authenticate the QRCC. For example, the QRCC may be authenticated using a pin number input by an administrator or user of the UE that is generating the QR image or the QRCC using a QR encryption algorithm. Additionally or alternatively, the QRCC may be authenticated using a serial number of the UE that is generating the QR image or the QRCC using a QR encryption algorithm. Other authentication or validation mechanisms such as encryption of the QRCC and decryption through use of a private key may be used in other embodiments. In some embodiments, the authentication and/or validation may be performed by the QRCC code reader 340, the QRCC translator 345, or some other module or element of the VCD 300. In other embodiments, the authentication and/or validation may be performed by the manageability engine 365.

Although certain actions or processes are described above as being performed by specific elements, for example, the QRCC redirector 330, the QRCC code reader 340, or the QRCC translator 345, in other embodiments the processes or elements may be performed by other software, hardware, or firmware modules. Additionally, in some embodiments one or more of the above-described elements such as the QRCC redirector 330 and the QRCC code reader 340 may be combined into a single module or element. Similarly, in some embodiments one or more of the above described modules or elements may be separate from one another, for example, the image processing unit 325 may be coupled with, but not include, the QRCC redirector 330. In some embodiments, one or more of the elements of the VCD 300, for example, the network adapter 355, may not be present.

As an example of data that may be included in a QR image according to embodiments described above, the QR image such as QR image 215 may be translated by one or more elements of the VCD 300 such as the QRCC code reader 340 as containing or including the following data (note that in some embodiments the data may be represented by hexadecimal or binary notation, and is listed here as a human-readable analogue or pseudo-code representation of such commands):

```
!! QRCC
!! CHANGE_MODE HD, BW, REBOOT
!! S/N:NXSHEAA013410BF217600
!! P/N:NXSHEAA.001
```

In the above-depicted example, "!! QRCC" may represent a QRCC tag that may indicate that the image is a QR image and the data in the QR image includes or contains a QRCC. "!! CHANGE_MODE HD, BW, REBOOT" may indicate one or more QRCCs that are related to one or more control commands of the VCD 300. For example, "CHANGE_MODE HD" may be related to a control command wherein a display or recording mode of the VCD 300 is changed to a high definition mode. "BW" may be related to a control command wherein a display or recording mode of the VCD 300 is changed to black and white. "REBOOT" may be related to a control command of the VCD 300 wherein the VCD 300 is rebooted. "!! S/N: NXSHEAA013410BF217600" may be an indication of a serial number of the UE, as described above. "!! P/N: NXSHEAA.001" may be an indication of a pin of the operator of the UE, as described above.

Figure 4:
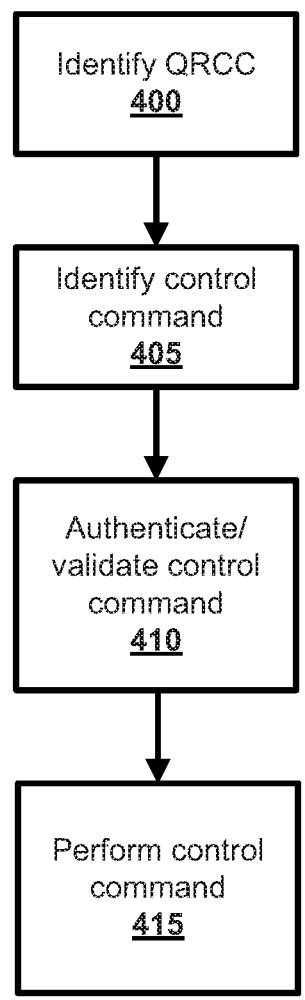
FIG. 4 illustrates a general example process for provisioning a VCD with a QR control code (QRCC), in accordance with various embodiments.

FIG. 4 depicts a generalized process for identifying a QRCC in a QR image received by a VCD such as VCD 300, and performing a control command at or by the VCD. Initially the VCD may identify a QRCC at 400. For example, the QRCC may be identified by a QRCC redirector such as QRCC redirector 330. In some embodiments, the QRCC may be identified based on a QRCC tag in the QR image. Next, a control command of the VCD may be identified at 405. Specifically, the control command may be identified based on the QRCC by a QRCC translator such as QRCC translator 345 using a dictionary such as dictionary 350. The identified control command may be passed to a manageability engine such as manageability engine 365, which may validate and/or authenticate the control command at 410, as described above. Next, the manageability engine may perform the control command at 415.

Figure 5:
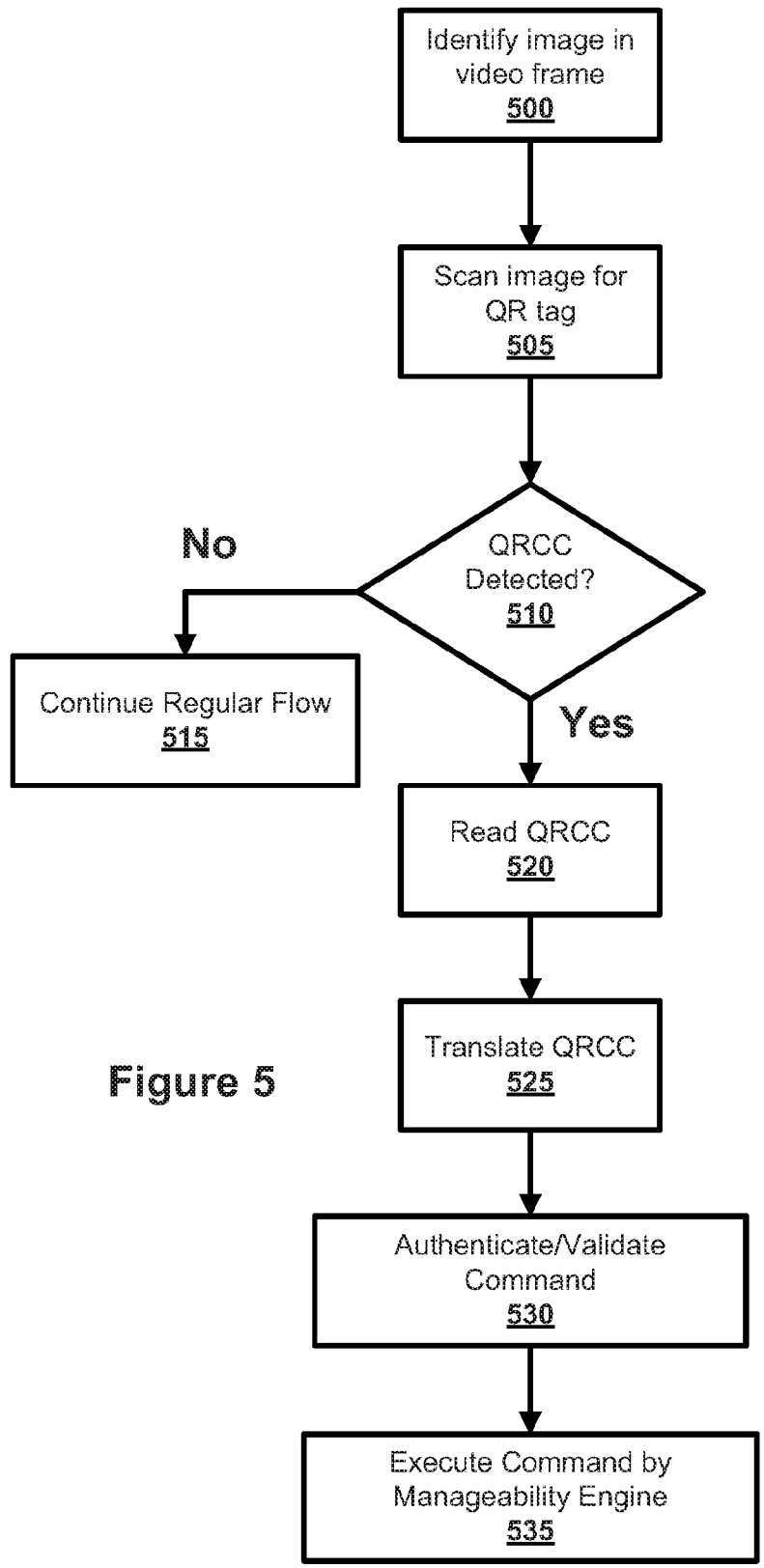
FIG. 5 illustrates a more detailed example process for provisioning the VCD with a QRCC, in accordance with various embodiments.

FIG. 5 depicts a more specific process that may be used by a VCD such as VCD 300 for identifying a QRCC in a QR image, and performing a control command related to the QRCC. Initially, an image in a video frame may be identified at 500, for example, by video processing unit 310, and more specifically by image processing unit 325. The image may be scanned for a QR tag at 505, for example, by QRCC redirector 330. If no QRCC or QRCC tag is detected at 510, then the VCD may continue with normal image flow at 515, for example, by passing the image or data related to the image to video application 335. However, if a QRCC or QRCC tag is detected at 510, for example, by QRCC redirector 330, then the QRCC may be passed to QRCC code reader 340.

QRCC code reader 340 may read the QRCC at 520, and pass the data related to the QRCC to the QRCC translator 345. The QRCC translator may translate the QRCC at 525 to identify a control command as described above. The QRCC translator may then forward the control command to the manageability engine 365, which may authenticate or validate the control command at 530 as described above. For example, the control command may be authenticated/validated based on a device serial number, a user pin, a private key, or some other authentication or validation process. The manageability engine may then execute the control command or perform one or more additional actions related to the control command at 535.

Figure 6:
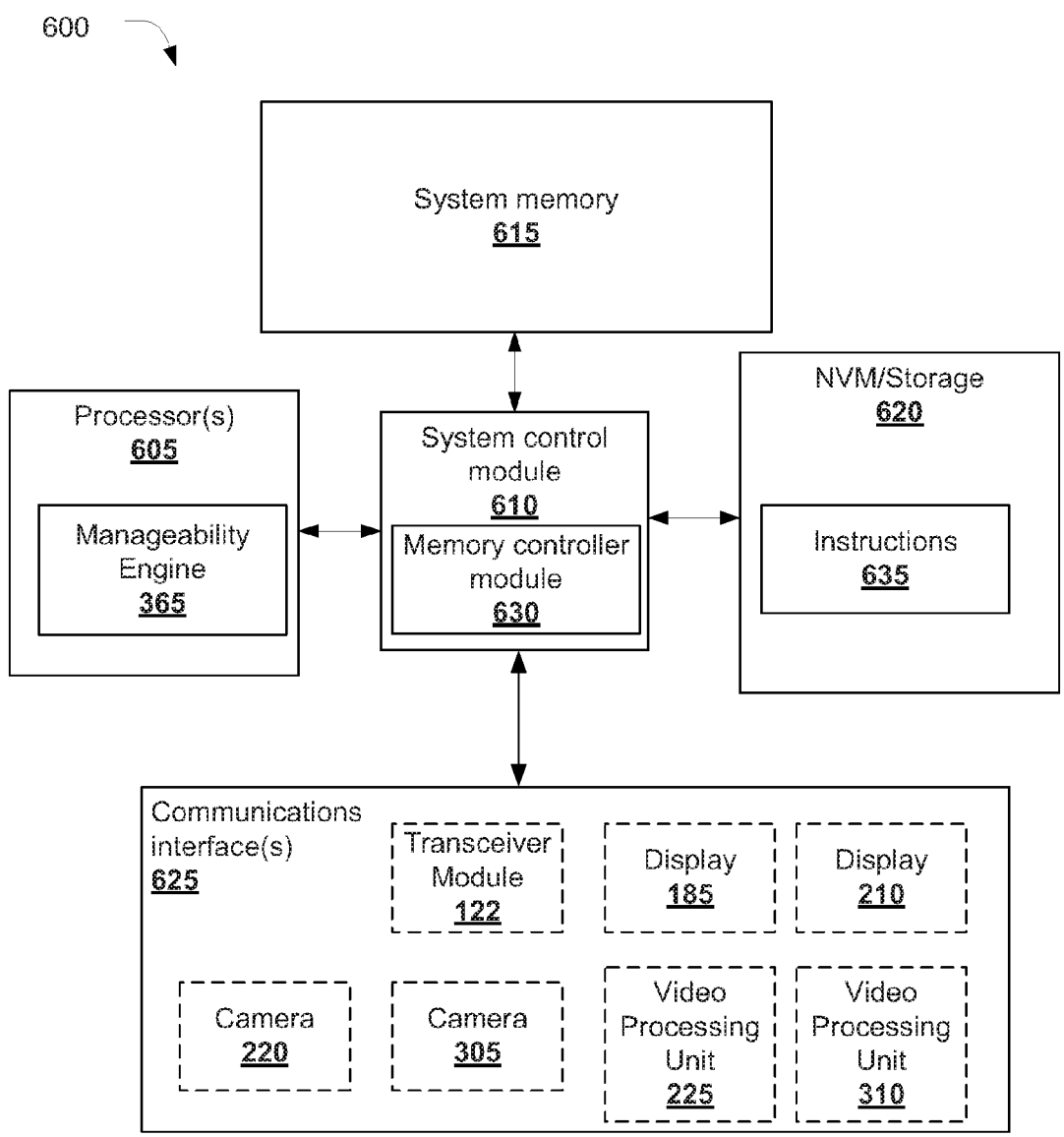
FIG. 6 schematically illustrates an example system that may be used to practice various embodiments described herein.

Embodiments of the present disclosure may be implemented into a system using any suitable hardware and/or software to configure as desired. FIG. 6 schematically illustrates an example system 600 that may be used to practice various embodiments described herein. FIG. 6 illustrates, for one embodiment, an example system 600 having one or more processor(s) 605, system control module 610 coupled to at least one of the processor(s) 605, system memory 615 coupled to system control module 610, non-volatile memory (NVM)/storage 620 coupled to system control module 610, and one or more communications interface(s) 625 coupled to system control module 610.

In some embodiments, the system 600 may be capable of functioning as the UE 110 or 200 as described herein. In other embodiments, the system 600 may be capable of functioning as BS 105, as described herein. In other embodiments, the system 600 may be capable of functioning as VCD 205 or 300, as described herein. In some embodiments, the system 600 may include one or more computer-readable media (e.g., system memory or NVM/storage 620) having instructions 635 and one or more processors (e.g., processor(s) 605) coupled with the one or more computer-readable media and configured to execute the instructions to implement one or more modules to perform one or more actions of the UE 110/200, BS 105 or VCD 205/300 described herein.

System control module 610 for one embodiment may include any suitable interface controllers to provide for any suitable interface to at least one of the processor(s) 605 and/or to any suitable device or component in communication with system control module 610.

System control module 610 may include memory controller module 630 to provide an interface to system memory 615. The memory controller module 630 may be a hardware module, a software module, and/or a firmware module.

System memory 615 may be used to load and store data and/or instructions, for example, for system 600. System memory 615 for one embodiment may include any suitable volatile memory, such as suitable dynamic random-access memory (DRAM), for example. In some embodiments, the system memory 615 may include double data rate type four synchronous dynamic random-access memory (DDR4 SDRAM).

System control module 610 for one embodiment may include one or more input/output (I/O) controller(s) to provide an interface to NVM/storage 620 and communications interface(s) 625.

The NVM/storage 620 may be used to store data and/or instructions, for example. NVM/storage 620 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 620 may include a storage resource physically part of a device on which the system 600 may be installed or it may be accessible by, but not necessarily a part of, the device. For example, the NVM/storage 620 may be accessed over a network via the communications interface(s) 625.

Communications interface(s) 625 may provide an interface for system 600 to communicate over one or more network(s) and/or with any other suitable device. The system 600 may wirelessly communicate with the one or more components of the wireless network in accordance with any of one or more wireless network standards and/or protocols. In some embodiments the communications interface(s) 625 may include transceiver module 122, displays 185 or 210, camera 220 or 305, or video processing unit 225 or 310.

For one embodiment, at least one of the processor(s) 605 may be packaged together with logic for one or more controller(s) of system control module 610, e.g., memory controller module 630. For one embodiment, at least one of the processor(s) 605 may be packaged together with logic for one or more controllers of system control module 610 to form a System in Package (SiP). For one embodiment, at least one of the processor(s) 605 may be integrated on the same die with logic for one or more controller(s) of system control module 610. For one embodiment, at least one of the processor(s) 605 may be integrated on the same die with logic for one or more controller(s) of system control module 610 to form a System on Chip (SoC).

In some embodiments the processor(s) 605 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or global positioning satellite (GPS) circuitry (not shown). In some embodiments the processor(s) 605 may include the manageability engine 365, as shown in FIG. 6. In other embodiments, the manageability engine 365 may be considered to include, or be separate from but coupled to, the processor(s) 605, the system control module 610, or one or more other elements of the system 600.

In various embodiments, the system 600 may be, but is not limited to, a server, a workstation, a desktop computing device, or a mobile computing device (e.g., a laptop computing device, a handheld computing device, a tablet, a netbook, a smartphone, a gaming console, etc.). In various embodiments, the system 600 may have more or less components, and/or different architectures. For example, in some embodiments, the system 600 includes one or more of a camera, keyboard, LCD screen (including touchscreen displays), non-volatile memory port, multiple antennas, graphics chip, application-specific integrated circuit (ASIC), and speakers.

Examples

A first example may include an apparatus comprising: a quick response control code, QRCC, redirector module to identify a quick response, QR, image; and a QR code module coupled with the QRCC redirector module, the QR code module to: identify, based on a QRCC tag in the QR image, a QRCC in the image; and identify a control command of the apparatus based on the QRCC.

Example 2 may include the apparatus of example 1, wherein the QR code module comprises a QR code reader module to identify the QRCC tag and a QRCC translator to identify the control command.

Example 3 may include the apparatus of example 1, wherein the QR code module is to identify the control command based on a comparison of the QRCC with a dictionary of command codes of the apparatus.

Example 4 may include the apparatus of any of examples 1-3, further comprising a manageability engine coupled with the QR code module, the manageability engine to perform the control command.

Example 5 may include the apparatus of example 4, wherein the manageability engine is further to authenticate, using a security parameter of a QR code encryption algorithm, the QRCC.

Example 6 may include the apparatus of example 5, wherein the security parameter is a pin, a serial number of a device, or a private key.

Example 7 may include the apparatus of any of examples 1-3, wherein the control command is a control command to reboot the apparatus, a control command related to security of the apparatus, a control command related to configuration of the apparatus, a control command to reset the apparatus, or a control command to perform recovery of the apparatus.

Example 8 may include the apparatus of any of examples 1-3, further comprising a camera coupled with the QRCC redirector module, the camera to capture the image.

Example 9 may include one or more non-transitory computer-readable media comprising instructions to cause a computing device, upon execution of the instructions by one or more processors of the computing device, to: identify a quick response command code, QRCC, tag in a quick response, QR, image; identify, based on the QRCC tag, a QRCC of the computing device; and facilitate performance of a control command by the computing device based on the QRCC.

Example 10 may include the one or more non-transitory computer-readable media of example 9, wherein the instructions further comprise instructions to authenticate the QRCC using a security parameter of a QR code encryption algorithm.

Example 11 may include the one or more non-transitory computer-readable media of example 10, wherein the security parameter is a pin, a serial number of a device, or a private key.

Example 12 may include the one or more non-transitory computer-readable media of any of examples 9-11, wherein the control command is a control command to reboot the computing device, a control command related to security of the computing device, a control command related to configuration of the computing device, a control command to reset the computing device, or a control command to perform recovery of the computing device.

Example 13 may include the one or more non-transitory computer-readable media of any of examples 9-11, wherein the instructions further comprise instructions to identify the control command based on a comparison of the QRCC with a dictionary of control commands of the computing device.

Example 14 may include the one or more non-transitory computer-readable media of example 13, wherein the instructions to facilitate performance of the control command include instructions to forward the control command to a manageability engine of the computing device.

Example 15 may include the one or more non-transitory computer-readable media of any of examples 9-11, wherein the computing device is communicatively decoupled from a data network.

Example 16 may include a method comprising: identifying, by an apparatus, a quick response command code, QRCC, based on a QRCC tag in a quick response, QR, image captured or received by the apparatus; identifying, by the apparatus, a control command based on the QRCC; and performing, by the apparatus, the identified control command.

Example 17 may include the method of example 16, further comprising authenticating the QRCC with a security parameter of a QR code encryption algorithm.

Example 18 may include the method of example 17, wherein the security parameter is a pin, a serial number of a device, or a private key.

Example 19 may include the method of any of examples 16-18, wherein the control command is a control command to reboot the computing device, a control command related to security of the computing device, a control command related to configuration of the computing device, a control command to reset the computing device, or a control command to perform recovery of the computing device.

Example 20 may include the method of any of examples 16-18, wherein identifying the control command includes comparing, by the apparatus, the QRCC with a dictionary of control commands of the apparatus; and identifying, by the apparatus and based on the comparing, the control command.

Example 21 may include the method of example 20, wherein facilitating performance of the control command includes performing, by the apparatus, an action indicated by the control command.

Example 22 may include the method of any of examples 16-18, wherein the computing device is communicatively decoupled from a data network.

Example 23 may include an apparatus comprising means to perform the method of any of examples 16-22.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:
1. An apparatus comprising:
   a quick response control code (QRCC) redirector module to identify a quick response (QR) image;
   a QR code module coupled with the QRCC redirector module, the QR code module to:
      identify, based on a QRCC tag in the QR image, a QRCC in the image; and
      identify a control command of the apparatus based on the QRCC; and a manageability engine coupled with the QR code module, the manageability engine to:
  perform the control command; and
  authenticate, using a security parameter of a QR code encryption algorithm, the QRCC.

2. The apparatus of claim 1, wherein the QR code module comprises a QR code reader module to identify the QRCC tag and a QRCC translator to identify the control command.

3. The apparatus of claim 1, wherein the QR code module is to identify the control command based on a comparison of the QRCC with a dictionary of command codes of the apparatus.

4. The apparatus of claim 1, wherein the security parameter is a pin, a serial number of a device, or a private key.

5. The apparatus of claim 1, wherein the control command is a control command to reboot the apparatus, a control command related to security of the apparatus, a control command related to configuration of the apparatus, a control command to reset the apparatus, or a control command to perform recovery of the apparatus.

6. The apparatus of claim 1, further comprising a camera coupled with the QRCC redirector module, the camera to capture the image.

7. One or more non-transitory computer-readable media comprising instructions to cause a computing device, upon execution of the instructions by one or more processors of the computing device, to:
  identify a quick response command code (QRCC) tag in a quick response (QR) image;
  authenticate the QRCC using a security parameter of a QR code encryption algorithm;
  identify, based on the QRCC tag, a QRCC of the computing device; and
  facilitate performance of a control command by the computing device based on the QRCC.

8. The one or more non-transitory computer-readable media of claim 7, wherein the security parameter is a pin, a serial number of a device, or a private key.

9. The one or more non-transitory computer-readable media of claim 7, wherein the control command is a control command to reboot the computing device, a control command related to security of the computing device, a control command related to configuration of the computing device, a control command to reset the computing device, or a control command to perform recovery of the computing device.

10. The one or more non-transitory computer-readable media of claim 7, wherein the instructions further comprise instructions to identify the control command based on a comparison of the QRCC with a dictionary of control commands of the computing device.

11. The one or more non-transitory computer-readable media of claim 10, wherein the instructions to facilitate performance of the control command include instructions to forward the control command to a manageability engine of the computing device.

12. The one or more non-transitory computer-readable media of claim 7, wherein the computing device is communicatively decoupled from a data network.

13. A method comprising:
  identifying, by an apparatus, a quick response command code (QRCC) based on a QRCC tag in a quick response (QR) image captured or received by the apparatus;
  authenticating the QRCC with a security parameter of a QR code encryption algorithm;
  identifying, by the apparatus, a control command based on the QRCC; and
  performing, by the apparatus, the identified control command.

14. The method of claim 13, wherein the security parameter is a pin, a serial number of a device, or a private key.

15. The method of claim 13, wherein the control command is a control command to reboot the apparatus, a control command related to security of the apparatus, a control command related to configuration of the apparatus, a control command to reset the apparatus, or a control command to perform recovery of the apparatus.

16. The method of claim 13, wherein identifying the control command includes comparing, by the apparatus, the QRCC with a dictionary of control commands of the apparatus; and
  identifying, by the apparatus and based on the comparing, the control command.

17. The method of claim 16, wherein facilitating performance of the control command includes performing, by the apparatus, an action indicated by the control command.

18. The method of claim 13, wherein the apparatus is communicatively decoupled from a data network.

* * * * *